(12) United States Patent
Smith-Rose et al.

(10) Patent No.: US 12,231,599 B2
(45) Date of Patent: Feb. 18, 2025

(54) COMPUTING DEVICES CONFIGURED FOR LOCATION-AWARE CALLER IDENTIFICATION AND METHODS/SYSTEMS OF USE THEREOF

(71) Applicant: Capital One Services, LLC, McLean, VA (US)

(72) Inventors: Asher Smith-Rose, Midlothian, VA (US); Lin Ni Lisa Cheng, Great Neck, NY (US); Joshua Edwards, Philadelphia, PA (US); Tyler Maiman, Melville, NY (US); Shabnam Kousha, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 353 days.

(21) Appl. No.: 17/944,833

(22) Filed: Sep. 14, 2022

(65) Prior Publication Data
US 2024/0089370 A1    Mar. 14, 2024

(51) Int. Cl.
   *H04M 3/42* (2006.01)
(52) U.S. Cl.
   CPC ... *H04M 3/42348* (2013.01); *H04M 3/42042* (2013.01); *H04M 2203/552* (2013.01)
(58) Field of Classification Search
   CPC ......... H04M 3/42348; H04M 3/42042; H04M 2203/552
   USPC ...................................... 455/414.1
   See application file for complete search history.

(56) References Cited

U.S. PATENT DOCUMENTS

| | | |
|---|---|---|
| 6,839,022 B1 | 1/2005 | Benco et al. |
| 7,227,931 B1 | 6/2007 | Latter et al. |
| 7,283,625 B2 | 10/2007 | Urban et al. |
| 7,286,657 B2 | 10/2007 | Latter et al. |
| 7,385,992 B1 | 6/2008 | Koch et al. |
| RE41,692 E | 9/2010 | Contractor |
| 7,839,986 B2 | 11/2010 | Di Giorgio et al. |
| 7,873,366 B2 | 1/2011 | Chen |
| 8,515,038 B2 | 8/2013 | Chmara et al. |

(Continued)

FOREIGN PATENT DOCUMENTS

WO       2002/011407 A2    2/2002

*Primary Examiner* — Don N Vo
(74) *Attorney, Agent, or Firm* — GREENBERG TRAURIG, LLP

(57) ABSTRACT

Systems and methods of location-aware caller identification via machine learning techniques are disclosed. In one embodiment, an exemplary computer-implemented method may include: utilizing a trained call annotation machine learning model to determine one or both of an annotating condition and annotating location granularity, and associate one location of a user with one phone number of the user based at least on one or both of the annotating condition and the annotating location granularity; receiving second transactional information of one transaction associated with a first user; extracting second location information from the second transactional information of the one transaction; utilizing the trained call annotation machine learning model to automatically annotate one phone number record of one phone number of the first user, with the second location information at the annotating location granularity to form at least one user-specific location-specific annotated phone number record.

20 Claims, 8 Drawing Sheets

(56) References Cited

U.S. PATENT DOCUMENTS

| | | | |
|---|---|---|---|
| 2014/0274002 A1* | 9/2014 | Hogan | G06F 16/00 455/415 |
| 2018/0032612 A1* | 2/2018 | Kariman | G06F 16/164 |
| 2022/0239773 A1* | 7/2022 | Garg | H04M 3/2218 |
| 2023/0300588 A1* | 9/2023 | Chiang | H04W 4/02 |

* cited by examiner

COMPUTING DEVICES CONFIGURED FOR LOCATION-AWARE CALLER IDENTIFICATION AND METHODS/SYSTEMS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to curate additional caller information to enhance caller line identification information (e.g., caller ID), including, but not limited to, annotate caller ID with callers' geographical location information.

BACKGROUND OF TECHNOLOGY

Typically, a computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, one exemplary technological problem exist when location information of a calling party may not be provided as part of the caller ID information identified by the phone number. Yet another exemplary technological problem may exist when the current technologies do not provide user configurable or contextually-determined criteria for selectively generating and/or dynamically displaying such geographical location information with accommodation of privacy controls.

SUMMARY OF DESCRIBED SUBJECT MATTER

In some embodiments, the present disclosure provides various exemplary technically improved computer-implemented methods involving location-aware caller identification, the method including steps such as: obtaining, by one or more processors, a trained call annotation machine learning model that determines one or both of an annotating condition and annotating location granularity, and associates at least one location of a user with at least one phone number of the user based at least on one or both of the annotating condition and the annotating location granularity; receiving, by the one or more processors, second transactional information of at least one transaction associated with a first user; extracting, by the one or more processors, second location information from the second transactional information of the at least one transaction; utilizing, by the one or more processors, the trained call annotation machine learning model to: determine at least one annotating condition based on at least one of: the second transaction information, profile information, or contextual information of the first user, where the annotating condition being indicative of a permission to annotate; determine an annotating location granularity for the second location information based on the at least one annotating condition; and automatically annotate at least one phone number record of at least one phone number, associated with the first user, with the second location information at the annotating location granularity to form at least one user-specific location-specific annotated phone number record; and instructing, by the one or more processors, a computing device of a second user to display the at least one user-specific location-specific annotated phone number record to the second user upon detecting an incoming call associated with the at least one phone number of the first user to the second user.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
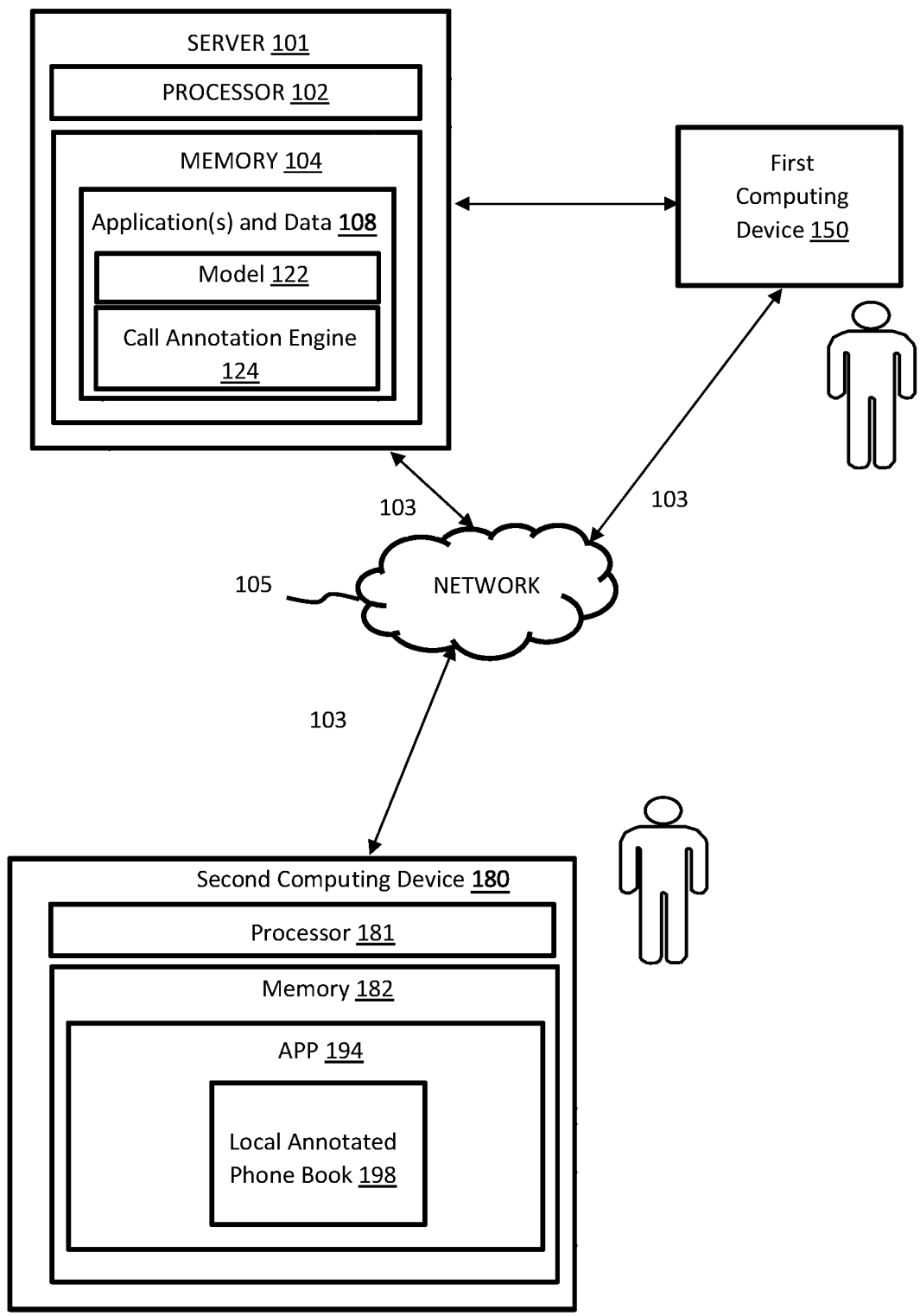
FIG. 1 is a block diagram of an exemplary system and/or platform illustrating features associated with location-aware caller identification, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the intelligence gleaned from user transaction data and at the same time to leverage advanced data processing capabilities, various embodiments of the present disclosure provide for improved computer-based platforms or systems, improved computing components and devices configured for one or more technological improvements/solutions involving: extracting location information from users' transaction data, annotating record(s) of the users' phone number(s) with user-specific location-specific information, dynamically displaying user-specific location specific annotated phone number record(s) as part of the caller identification (ID) information associated with call(s), as well as generating intelligence (e.g., machine learning models, etc.) empowered by the user location information associated with various transaction data, user phone number information associated with the location information, user profile information and/or user contextual information to, for example, automate the determination of an annotating condition, an annotating location granularity, and/or a display qualifier with enhanced efficiency, accuracy, relevancy, accessibility, and privacy control.

Various embodiments disclosed herein may be implemented in connection with one or more entities that provide, maintain, manage, and/or otherwise offer any services involving various transaction data and/or communication(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that at least entails providing transaction cards to customers, the transaction card configured for use at transacting terminals to access associated financial service accounts. In some embodiments, financial service accounts may include, for example, without limitations, credit card accounts, bank accounts such as checking and/or savings accounts, reward or loyalty program accounts, debit accounts, mortgage accounts, auto vehicle loan accounts, and/or any other type of financial service accounts. For example, a transaction account (e.g., credit card account debit card account, mobile pay account, royalty point account, banking account, trading account, virtual credit card account, bitcoin account, etc.) of a user may be set up and updated in association with various respective user profile information such as, one or more mobile phone numbers of the user, a home address of the user, a work address of the user, and the like.

For purposes of illustration, data structures and/or operations specific to phone calls may be used herein as non-limiting examples to describe some embodiments of the present disclosure. In some embodiments, various aspects of various disclosed technological improvements apply to communications at various modalities. For example, the location information may be used to annotate record(s) associated with identification(s) of a user's (e.g., communication-initiating user, etc.), email address, chatting account, social media account, and so on. Correspondingly, the location information may be dynamically displayed to another user in receipt of an incoming communication initiated by the user via various communication modalities. By way of non-limiting examples, such communications may be in the forms of an SMS, an MMS, an email, a voice message, a chatting message, a social media message, a push message of an application, and the like, not limited by the embodiments illustrated herein.

FIG. 1 depicts an exemplary computer-based system 100 illustrating aspects of technologically improved location-aware caller identification via utilization of at least one machine learning technique, in accordance with one or more embodiments of the present disclosure. An exemplary system 100 may include at least one server 101, and at least one first computing device 150 associated with a first user, which may communicate 103 over at least one communication network 105. In some embodiments and in optional combination with one or more embodiments described herein, the system 100 may further include and/or be operatively connected and/or be in communication (e.g., electronic communication, telecommunication) with at least one second computing device 180 associated with a second user, the second computing device 180 may also communicate with via the communication network 105 to, for example, receive phone call(s), SMS message(s), MMS message(s), chat application messages, social media messages, and the like, from the first computing device 150.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, or it may be part of a subsystem, which may, in turn, be part of a larger computer system. In some embodiments, server 101 may be associated with an entity such as a financial institution, such as a credit card company that services an account of the user, and thereby having access to transactions performed by various users in addition to their respective account information.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with location-aware caller identification, in conjunction with or independent of location-aware caller identification functionality implemented at the first computing device 150 and/or the second computing device 180.

In some embodiments, the features and functionality may include operations such as: obtaining training data (e.g., training location information associated with training transaction data of a first plurality of users, training phone number information of a first plurality of phone numbers associated with the first plurality of users, and/or the profile information and/or contextual information associated with the first plurality of users); obtaining a trained call annotation machine learning model that determines one or both of an annotating condition and annotating location granularity; receiving an indicator identifying a permission by the second user to detect phone calls, emails, messages, and/or other communications received at a computing device of the second user; receiving transactional information of at least one transaction associated with the first user; extracting location information from the transactional information of the at least one transaction; utilizing the trained call annotation machine learning model to at least: 1) determine at least one annotating condition based on at least one of: the transaction information, profile information of the first user, or contextual information of the first user, where the annotating condition being indicative of a permission to annotate; 2) determine an annotating location granularity for the location information based on at least of one of: the one annotating condition, the transaction information, profile information of the first user, or contextual information of the first user, and/or 3) automatically annotate at least one phone number record of at least one phone number, associated with the first user, with the location information at the annotating location granularity to form at least one user-specific location-specific annotated phone number record; and instructing the second computing device 180 to display the at least one user-specific location-specific annotated phone number record to the second user upon detecting an incoming call associated with the at least one phone number of the first user. In some embodiments not shown herein, the features and functionality of the server 101 may be partially or fully implemented at the first computing device 150 of the first user such that the illustrative process to provide location-aware caller identification may be performed partially or entirely on the first computing device 150.

In some embodiments, the application(s) and data 108 may include an exemplary call annotation machine learning model 122. In some embodiments, the call annotation machine learning model 122 may be trained at the server 101. In other embodiments, the call annotation machine learning model 122 may be trained by another entity with the training data provided by another entity, and/or with the training data provided by server 101. In some embodiments, the call annotation machine learning model 122 may also be trained and re-trained at the first computing device 150 associated with the first user. In the latter case, the call annotation machine learning model 122 may be trained and/or re-trained with training data specific to the first user at the first computing device 150. In this sense, the call annotation machine learning model 122 itself may be user-specific, residing on the server 101 and/or the first computing device 150.

Various machine learning techniques may be applied to train and re-train the call annotation machine learning model 122 with training data and feedback data, respectively. In various implementations, such a machine learning process may be supervised, unsupervised, or a combination thereof. In some embodiments, such a machine learning model may include a statistical model, a mathematical model, a Bayesian dependency model, a naive Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:

a. Define Neural Network architecture/model,
  b. Transfer the input data to the exemplary neural network model,
  c. Train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination with any embodiment described above or below, the exemplary call annotation machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the application(s) and data 108 may include a call annotation engine 124 that may be programmed to execute the exemplary call annotation machine learning model 122. In some embodiments, the call annotation engine 124 may receive, as input, an indication of new location information associated with a particular phone number of the first user, and utilize the call annotation machine learning model 122 to identify one or both of at least one annotating condition and at least one annotating location granularity for the new location information. Subsequently, the call annotation engine 124 may compile, generate, and/or update an annotated record that correlates the phone number information of the particular phone number with the new location information at the at least one annotating location granularity, and/or according to the at least one annotation conditions. In some embodiments, the annotated record may be stored in association with the identification information of the first user and/or the particular phone number of the first user, at the application(s) and data 108, or an external data source, in the form of, for example, an annotated phone book, and the like. In some embodiments, the entire or portions (e.g., updated portions) of the annotated phone book may be transmitted to the second computing device 180 in response to the indication that an incoming call is being received at the second computing device 180 from the particular phone number of the first user. In other embodiments, the transmission of the annotated phone book (entirety or portions of) may be triggered by a user other than the first user calling the second user via the particular phone number. In some embodiments, regardless of whether the second computing device 180 receives any incoming calls, the entire or portions (e.g., updated portions) of the annotated phone book may be transmitted to the second computing device 180 at a pre-configured schedule (e.g., once a day, once a week, etc.), and/or upon any annotated record having been updated with new location information with regard to at least one phone number enlisted in the annotated phone book. More details of the call annotation machine learning model 122 and the call annotation engine 124 are described with reference to FIG. 4, below.

Still referring to FIG. 1, an illustrative second computing device 180 associated with the second user may include: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the user for a permission to detect communications via the second computing device 180 (e.g., phone calls, SMS, emails, etc.); detecting communications via the second computing device 180 according to the permission obtained from the second user; receiving, storing, querying, and/or updating a local annotated phone book 198 of one or more user-specific location specific annotated phone number records; and triggering the second computing device 180 into displaying at least one user-specific location-specific annotated phone number record associated with the phone number of the first user, to the second user, upon detecting an incoming call associated with the at least one phone number of the first user.

In some embodiments, the application 194 may be configured to receive one or more display qualifiers in association with the local annotated phone book 198, or separately from receiving the local annotated phone book 198. In some embodiments, the application 194 may be configured to obtain various information (e.g., profile, contextual, etc.) of the second user and/or the second computing device 180, and apply such information to the one or more display qualifiers to determine and display only the information indicated as allowed to be displayed to the second user and/or the second computing device 180 according to the one or more display qualifiers.

For example, the display qualifier may specify for the second computing device 180 to display the location information annotated in the phone number record of the first user only when the first user and the second user are within a pre-configured geographical distance (e.g., in the same city) with each other, when the first user calls the second user from the phone number associated with the annotated phone number record of the first user. This way, the application 194 may be configured to compare the location information annotated in the local annotated phone book 198 of the first user to location information of the second user (e.g., using GPS technology or the location information of an annotated phone number record associated with the second user, and the like) to determine whether to display the location information of the first user, independent from the fact the local annotated phone book 198 already has the location information of the first user.

In another example, the display qualifier may specify for the second computing device 180 to display the location information annotated in the phone number record of the first user only when the second user and/or the second computing device 180 satisfies one or more pre-configured relationships with the first user and/or the first computing device 150, when the first user calls the second user from the phone number annotated. In one embodiment, the pre-configured relationships may include and/or defined by, by way of non-limiting examples, how many times the first user has initiated communications with the second user within a certain period of time (e.g., daily, weekly, etc.), how many times the second user has initiated communications with the first user within a certain period of time (e.g., daily, weekly, etc.), a relationship stored in the first user and/or second user's profiles (e.g., family member, association members, etc.), a relationship reflected via information associated with the first user and/or the second user's personal address book(s) (e.g., phone numbers labeled with associated with family members, associated with a group of soccer dads, etc.), and the like.

In some embodiments, the application 194 may be configured to receive various information (e.g., profile, contextual, etc.) of the first user and/or the first computing device 180, and apply such information to the one or more display qualifiers to determine and display only the information indicated as allowed to be displayed to the second user and/or the second computing device 180 according to the one or more display qualifiers. For example, the display qualifier may specify that, when the first user calls the second user with regard to a delivery service (e.g., DoorDash delivery, Uber ride arrival, etc.) for the second user, the location information annotated in the annotated phone book can be displayed to second user. In some implementations, such context of the first user at the time of the call may be determined by detecting that a particular application (e.g., DoorDash app, Uber app, etc.) is executing on the first computing device 150, or the like. More details with regard to the display qualifier and its application are described with reference to FIG. 4, below.

In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the second computing device 180. For instance, such application may be configured to detect a variety of communications of the second user at the second computing device 180, intercept those communications at the second computing device 180, monitor those communications at the second computing device 180, and/or interject one or more suitable controls (e.g., user operable controls) over those communications at the second computing device 180. In some embodiments, such application may be configured to obtain information of the communication transmitting party(ies) (e.g., the calling phone number), information of the communication (e.g., the time duration of a phone call), the content of the communication (e.g., the identity of an SMS sending entity, the content of the conversation of a phone call). In some embodiments, such an application may be configured to obtain permissions from the second user in order to execute all or part of the exemplary functionality described above. In some embodiments, the application 194 may be configured to execute on the first computing device 150 as well.

In some embodiments, for the purpose of simplicity, features and functionalities associated with the exemplary call annotation machine learning model 122 (e.g., training, re-training, etc.) are illustrated as implemented by components of server 101. It should be noted that one more of those call annotation machine learning model-related aspects and/or features may be implemented at or in conjunction with the first computing device 150 of the first user. For example, in some embodiments, the call annotation machine learning model 122 may be partially trained at the server 101 with other users' location information and corresponding annotated phone number information associated with the phone numbers thereof, and in turn transmitted to the first computing device 150 to be fully trained with the first user specific location information and annotation of the phone number information associated therewith. In another example, the converse may be performed such that the machine learning model 122 may be initially trained at the first computing device 150 and subsequently transmitted to the server 101 for application and/or further training with training data from other users.

Further, the local annotated phone book 198 may also be stored entirely on the second computing device 180, in conjunction with the server 101, or entirely at server 101. In some embodiments, when the call annotation machine learning model 122 is trained or re-trained at the first computing device 150, the call annotation machine learning model 122 may be utilized to, at least with regard to the location information of the first user, generate or update the annotated phone number record(s) locally or in conjunction with the server 101. In one embodiment, the first computing device 150 and/or second computing device 180 may be configured to synchronize a local phone book of annotated phone number records to the server 101 for storage and/or access by computing devices of other users. In some implementations, the synchronization may be performed in any suitable manner such as, for example, in a pushing manner initiated by the first computing device 150/the second computing device 180, in a pulling manner initiated by the server 101, or in combination thereof.

While only one server 101, first computing device 150, second computing device 180, and network 105 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For example, in some embodiments, the features and functionality of the server 101 may be partially, or fully implemented at the first computing device 150 and/or the second computing device 180. In another example, in some embodiments, the features and functionality of the second computing device 180 may be partially, or fully implemented at the server 101. In yet another example, in some embodiments, the features and functionality of the first computing device 150 may be fully or partially implemented at the second computing device 180, and vice versa, not limited by the embodiments illustrated herein.

Figure 2:
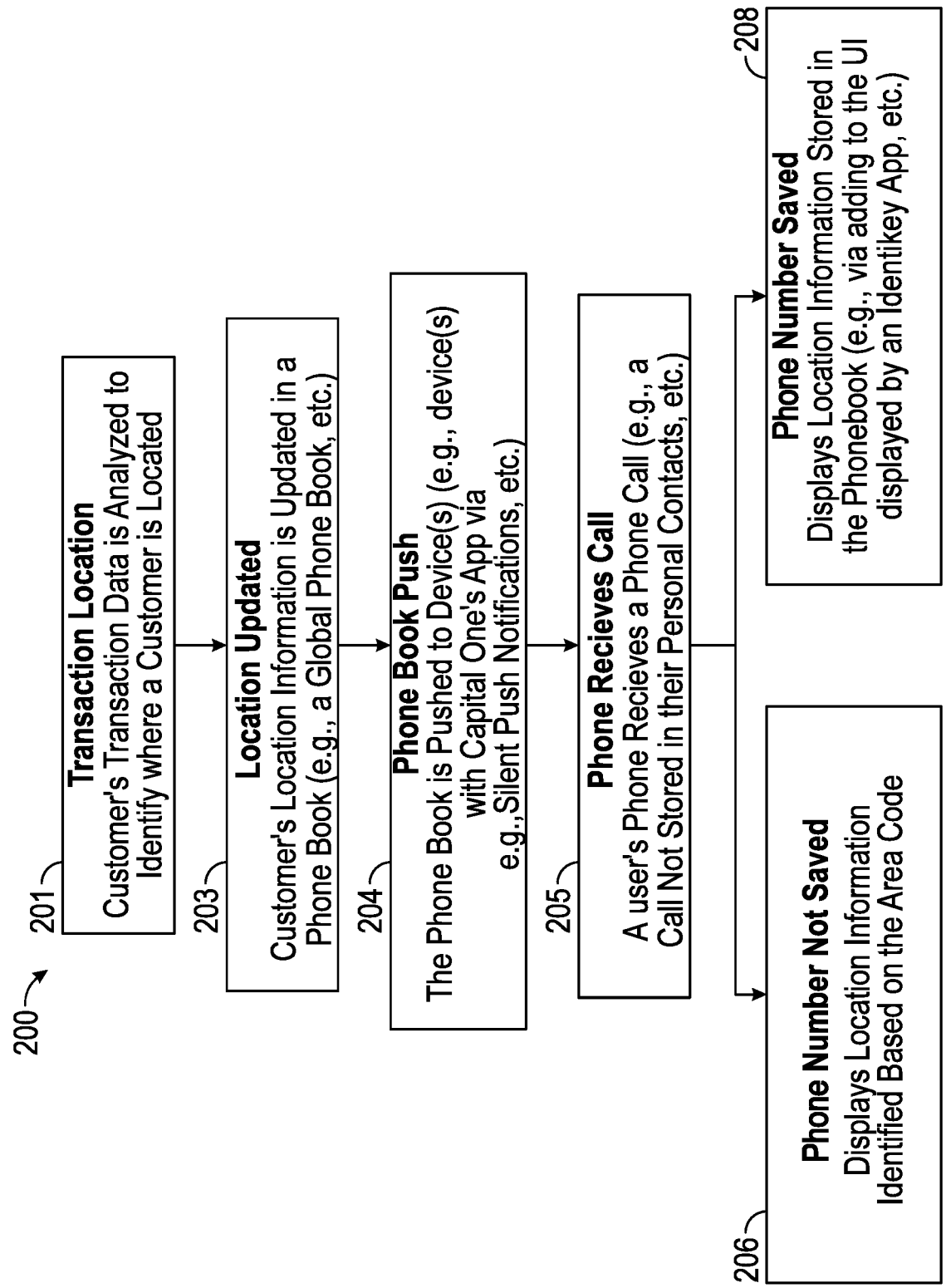
FIG. 2 is a diagram of an exemplary process involving aspects and features associated with location-aware caller identification, consistent with exemplary aspects of certain embodiments of the present disclosure.

FIG. 2 is a diagram illustrating an exemplary location-aware caller identification using one or more machine learning techniques, consistent with exemplary aspects of certain embodiments of the present disclosure. In this illustrated embodiment, the exemplary location-aware caller identification process 200 may include two part—first to curate caller location information and annotate the phone number record(s) associated with the phone number(s) of a customer with the curated caller location information; and second to provide and display the annotated phone number record(s) as part of the caller ID information for a call incoming from a phone number of the customer to another user (e.g., another customer, etc.). In this example, the customer (e.g., a calling party) may be the first user, the another user (e.g., a call receiving party) may be the second user, the call incoming may be initiated by the first user via the first computing device 150, and/or the call incoming may be received by the second user via the second computing device 180, as illustrated in FIG. 1.

Here, at the beginning of this exemplary location-aware caller identification flow, the customer's transaction data is analyzed (201) to identify transaction location(s) where the customer performs the corresponding transaction(s). Such transaction(s) may be associated with purchases of goods and/or services such as, a cup of coffee, lunch, groceries, Wi-Fi access at a hotspot, car wash service, loan applications, ATM transactions, over-the-counter bank transactions, and so on. In some embodiments, the transaction data may be obtained from one or more transactions the customer makes at a brick and mortar store by, for example, using his or her transaction card to effectuate the transaction(s) at a point of sale device of a merchant of the brick and mortar store. Various embodiments may be configured such that the customer may also make the transaction(s) using other payment methods such as a mobile wallet, a virtual card, loyalty points associated with an application executing on a mobile device of the customer, and the like. In this scenario, the transaction data may be processed to extract information such as the geographical location of the brick and mortar store (e.g., the store address associated with the brick and mortar store), the time information associated with the transaction, and the like. With the knowledge of both the location information and the time information, the customer can be known to be located at a location indicated by the location information (e.g., in the neighborhood or in the proximity), within a time window around the extracted time information. In various embodiments, the location information may include data such as landmarks, street names, street numbers, building names, GPS data, neighborhood names, district names, states, countries, regions, etc.

In some embodiments, the transaction data may be obtained from one or more transactions the customer makes online by, for example, using his or her transaction card to effectuate the transaction(s) at a checkout page of an e-commerce merchant's website. Various embodiments may be configured such that the customer may similarly make the transaction(s) online using other payment methods such as a mobile wallet, a virtual card, virtual currency, loyalty points associated with an application executing on a mobile device of the customer, and the like. In this scenario, even though the transaction is not made at a physical location such as an in-store transaction described above, the transaction data associated with the transaction may nevertheless be processed to extract location information and/or time information as well. In one example, when an online transaction is to be completed by a delivery or pick-up portion at the estimated point of time, the location information of the delivery address or the store address for the pick-up may be utilized as the customer's location information, in a time window based around the estimated delivery time or pick-up time. In another example, when an online transaction is associated with purchases such as a business trip, a vacation package, etc., the online transaction is inherently privy to the content of the purchase such as the location information as well as time information associated with the future activities/whereabouts of the user. For instance, for a vacation package booked via an online transaction, the transaction data can be processed to extract the location information with regard to the itineraries (e.g., flight schedules) and the destination information (e.g., hotel location information), as well as the time information associated with the flight schedule and the reserved hotel stay. With the in-store transaction scenario described above, the transaction data based on in-store transactions may be processed to extract the location information of the customer in a relatively contemporaneous manner. Here, the transaction data based on online transactions may be processed to extract the location information of the customer in a relatively time-shifted manner (e.g., futuristic manner as the customer is to be located at the location associated with the pick-up or delivery address in one hour from the time of the online transaction, or at the location associated with the address of the hotel reserved in the vacation package during the days the customer has made the reservation for a hotel room, etc.).

In some embodiments, a confidence score with regard to the accuracy of the annotated location information may also be additionally computed based on the transaction data and/or the profile/contextual information of the first user. For example, for the new location information extracted based on an in-store transaction of the first user, a confidence score may be computed as high when the first user calls the second user within the next ten to fifteen minutes and the first user is detected as walking. In another example, for the same location information extracted from the same transaction of the first user, the confidence score may be computed as median when the first user is detected as driving and calling the second user within the next ten to fifteen minutes. In yet another example, for the location information associated with the destination of a vacation reservation of the first user, once the first user has been detected as boarding the flight departing for the destination, the confidence may be computed as high.

Next, the extracted location information of the customer is utilized to update (203) a phone book (e.g., annotated phone book). In some embodiments, the phone book may be a data collection maintained by an entity who have access to the transaction data of various customers. For example, the data collection may be configured to store various customer information associated with one or more phone numbers of the customer. In some embodiments, the phone book may be implemented as a global data collection (e.g., a global phone book) such that the entity may configure the entire or portions of the phone book for access by other customers associated with the entity. In one example, the entity may be a banking entity such as Capital one.

The phone book may be stored in various suitable data structures such as a database, a table, or plain text. Any suitable techniques may be utilized to update the phone book with the location information associated with the phone number(s) of the customer. For example, the phone book may be configured that, for each customer, there is a phone number record entry indexed under the identity of each customer, and a phone number record entry may be configured to store entries of at least one phone number of the customer paired with the location information lastly determined as associated with the phone number. In some embodiments, when the customer have one or more phone numbers associated therewith, the phone book may update the entries corresponding to all of the phone numbers of the customer with the newly identified location information, or only update entry(ies) corresponding to the phone number(s) associated with the mobile devices of the customer (e.g., not to update the location information associated with a landline phone number of the customer), the phone number(s) enlisted in association with the transaction based which the new location information is determined, the transaction card, and the like. In some implementations, the phone book may be stored at the server 101 of FIG. 1.

In some embodiments, when the location information determined based on the transaction data is of a relatively contemporaneous nature, the phone book may be updated immediately in real time or near real time to reflect the discerned change in the customer's location. In one example, the newly obtained location information may overwrite the existing location information associated with the phone number(s) in the phone book. In some implementations, the newly obtained location information may be associated with a timestamp associated with the transaction data. In other embodiments, when the location information determined based on the transaction data is of a relatively less contemporaneous nature, the phone book may also be updated, immediately in real time or near real time, to reflect the future change in the customer's location, with a time qualifier. That is, the phone book may be configured to include additional descriptive information (e.g., metadata) with respect to the discerned location information (e.g., which location information is valid from what time to what time). In the latter case, the phone book may be configured to store a multitude of location information with respective metadata for each of the phone number(s) of the customer. In some embodiments, the newly obtained location data determined as valid during a future period of time may not overwrite the existent location information associated with the phone number(s) of the customer. Instead, such location information may be stored along with the existing location information by, for example, including a time qualifier to specify the future time duration during which the newly obtained location information is to be valid. For example, when the customer books two business trips to two different destinations back to back in one transaction, the phone book may be updated with at least two sets of location information corresponding to the two destinations, each with its own time qualifier corresponding to the duration of the two trips.

In some embodiments, when the location information extracted from the transaction data is qualified with a confidence score described above, the confidence score may be stored in the phone book as well along with the respective location information that is used to update the phone book. In some embodiments, multiple location information associated with respective confidence score may be stored in the phone number record of the customer for a single phone number of the customer. In other embodiments, the phone book may be configured to update the phone number record only when the confidence score associated with the location information exceeds, for example, a pre-configured threshold.

Here, in this illustrative example, the location information extracted from the transaction data may be used to annotate the phone number record directly. For example, the street address of the brick and mortar store may be used to annotate the phone number record of the customer. In some embodiments, before the location information obtained from the transaction data can be used for annotation, the process 200 may be configured to determine at least one of an annotating condition and a location granularity. In one example, the first user may have configured for his/her phone number record in the phone book as not to be annotated with any location information. In another example, the first user may have configured such a record as annotating only at a certain location granularity, e.g., of a city, a state, etc. As such, still using the example where the street address is obtained as the location information, the phone number record of the customer may only be annotated with new location information indicating the city portion of the street address. Various embodiments may be configured such that the condition (e.g., whether or not to annotate, when to annotate, etc.) and/or the location granularity at which the annotation is to be performed is determined by applying the call annotation machine learning model (e.g., the machine learning model 122), more details of which are described with reference to FIG. 4, below.

Once the phone number record(s) associated with the customer is updated, the process 200 concludes the first part of curating the location information based on transaction data of the customer and annotating with such location information. Subsequently, the process 200 proceeds to the second part for providing and displaying the annotated phone number record(s) to a user who receives a call incoming form a phone number of the customer.

In this example, in the second part, the phone book is pushed (204) to one or more computing devices of the customers subscribing to the location-aware caller ID service. In some embodiments, the customers may subscribe to such caller location service by opting in via an application executing on their computing devices. In other embodiments, the customers may subscribe to such caller location service by signing up to receive the phone book and its update(s) via a web portal associated with the service. Various embodiments herein may be configured such that the phone book may be transmitted to subscribing devices of the customers using any suitable techniques, such as automatic downloading, silent push notifications, not limited by the illustrated examples. In some embodiments, only portions of the phone book that have been updated may be pushed to the one or more subscribing devices. Details are similar to those illustrated with reference to FIG. 1 and not repeated herein.

Next, the user receives (206) a phone call from a phone number that is not stored in the user's personal contacts. For example, the user may maintain a list of personal contacts of phone numbers enabled by the phone functionality of a mobile device of the user. In this illustrated example, the location-aware caller identification process 200 is invoked in the second part when the call is incoming from a phone number unknown to the user. In some embodiments, backtracking to the previous step when the phone book is pushed to the computing device of the user, a filter may be applied to the phone book using the personal contacts of the user so that only the phone number record(s) not associated with those phone numbers enlisted in the user's personal contacts are pushed to the computing device of the user. However, in other embodiments, the entire or portions of the phone book may be pushed to the computing device of the user without applying any filtering for customization based on the personal contacts of the user.

Here, along the path 206, the phone number not stored in the user's personal contacts is likewise not recorded in the phone book. That is, the call incoming is not associated with a phone number that has a corresponding entry as an annotated phone number record(s). For example, the call may not have come from the customer, who does have entry(ies) in the phone book in association with one or more phone numbers. As a result, a caller ID may be displayed to the user based on the known techniques such that, for example, the location information identified based on the area code of the phone number is displayed. In this case, the location information may not indicate the real location associated with the customer who initiates the call to the user. That is, for a phone number with an area code associated with the metropolitan area of New York, the caller ID will display New York as the location information regardless of whether the caller is presently located in or travels to California.

However, along the path 208, the phone number not stored in the user's personal contacts is recorded in the phone book. That is, the incoming call is associated with a phone number that has a corresponding entry as an annotated phone number record(s). For example, the user may have received the call from the customer described above in connection with the first part of the location-aware caller identification process 200. As a result, the location information stored in the phone book is retrieved and displayed as part of the caller ID information to the user. In some embodiments, one or more display qualifiers are also retrieved from the phone book (or respective data store) such that the display of the location information is further controlled or filtered by the application of the one or more display qualifiers. For example, the annotation entry corresponding to the phone number of the customer may include a display qualifier that requires the user to be within a certain distance from the customer at the time of the call for the location information to be displayed. In another example, the display qualifier may require that the user has placed call(s) to the customer in the past in order to display the location information of the customer. More details with regard to the display qualifier may be described in connection with FIGS. 3A-3C and 4, below.

Although not illustrated in this example, it should be noted that the location-aware caller identification process 200 may be invoked regardless of whether the phone number associated with an incoming call to the user is enlisted in the personal contacts (or any suitable data storage) of the user. Various embodiments may be configured such that when the user receives (205) a call, the location-aware caller identification process 200 may consult the phone book (e.g., local or remote) to determine whether and/or how to display the location information annotated for the phone number. In some embodiments, when the phone number associated with the incoming call is stored in the user's personal contacts, the information stored together with the phone number in the personal contacts may be utilized by the one or more display qualifiers to determine whether and/or how to display the location information about the customer to the user. In one example, the personal contacts indicate that the customer is a family member of the user, and the display qualifier specifies that the location information may be displayed at a location granularity of a street address, if captured in the phone book, only to family members. On the other hand, the display qualifier may specify to display the location information with less specificity (e.g., at a coarser location granularity such as a district, state, country, etc.) when the user is not a family member of the customer. Various information collected in connection with the user's personal contacts may be utilized as conditions and context information on the call receiving end to dynamically determine whether and how to display the location information annotated in the phone book. By ways of non-limiting examples, such information may include, a first name, a last name, a nickname, a work address, a home address, a URL link, a social media link, a profile, other phone numbers, an email address, a note, and the like.

Figure 3:
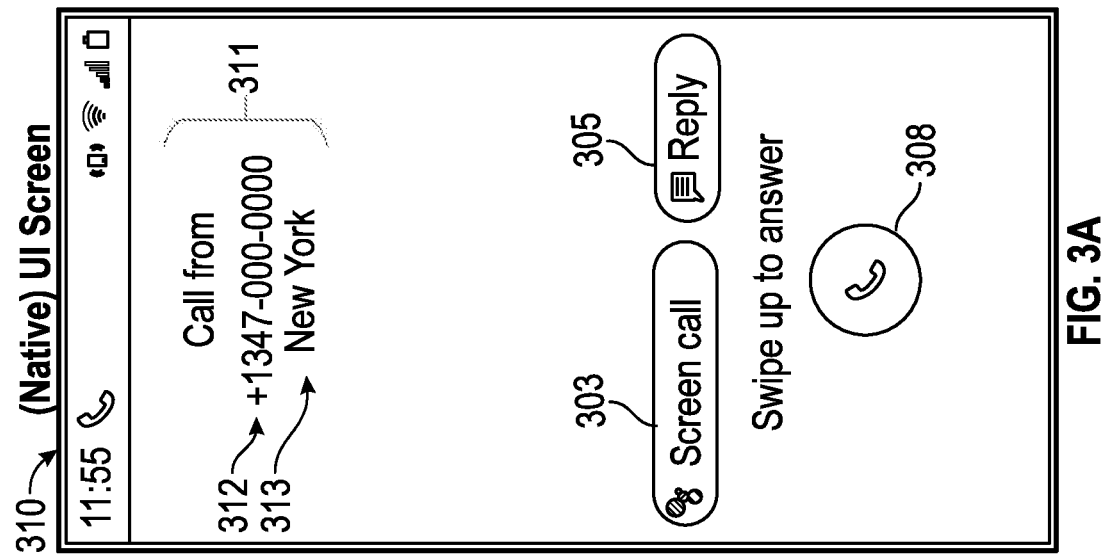
FIGS. 3A-3C are diagrams illustrating exemplary graphical user interfaces (GUIs) involving aspects and features associated with location-aware caller identification, consistent with exemplary aspects of certain embodiments of the present disclosure.

FIGS. 3A-3C are diagrams illustrating exemplary graphical user interfaces (GUIs) involving aspects associated with exemplary location-aware caller identification, consistent with exemplary aspects of certain embodiments of the present disclosure. In some embodiments, the GUIs may be provided by an application (e.g., the application 194 executing on the second computing device 180 of FIG. 1) and shown on a display of a mobile device (e.g., the second computing device 180 of FIG. 1). In some embodiments, in response to a call incoming at the mobile device from a phone number, the application (194) may be activated to enhance the caller ID information with the location information based on the annotated phone number record(s) associated with the phone number. In some embodiments, and shown in FIGS. 3A-3C, the application 194 may be configured to display the user-specific location-specific annotated phone number record associated with the customer (e.g., location information) to the user as part of the caller ID information (e.g., an enhanced GUI for representing caller ID). For instance, the application 194 may be configured to make an API request (e.g., a push call) to the phone interface application (e.g., the native phone application configured to display caller ID information (e.g., telephone number, caller's name, etc.) on the display of the mobile device) to pass the information of the user-specific location-specific annotated phone number record, for example, as a parameter to the phone interface application. As a result, upon receiving the information of the user-specific location-specific annotated phone number record, the phone interface application may be configured to display the information of the user-specific location-specific annotated phone number record on the display of the mobile device.

Any suitable techniques may be implemented to represent and notify to the user of the user-specific location-specific annotated phone number record (e.g., location information), not limited by the embodiments illustrated herein. By way of non-limiting examples, the user-specific location-specific annotated phone number record may be parameters provided to the user using media such as an audio message, a graphical display (e.g., a banner, a float window overlaying the GUI of the native phone interface application, etc.), a push notification, a textual display at the GUI elements of a home screen of the computing devices, and so on.

FIG. 3A illustrates an exemplary GUI 310 of the application (e.g., the application 194) for displaying caller ID information to the user upon a call incoming at the mobile device. The GUI 310 may include a caller ID 311, as well as a set of buttons 303, 305, and 308 for the user to select. Here, the caller ID 311 may be configured to display to the user that the call is from a calling entity associated with a calling phone number 312, as well as that the calling entity is at a location indicated by the location information 313.

In this illustrative embodiment, the phone number may not have a corresponding entry in the annotated phone book, or, as described above with reference to FIG. 2, the phone number may have already been enlisted in the personal contacts of the user. Thus, in the former case, the application may not know any location information of the caller, as the annotated phone book does not have any information about this particular phone number. In the latter case, however, in some embodiments, even though the location information is available in the annotated phone book, the application is pre-configured not to retrieve and display such location information when those phone numbers are in the user's personal contacts.

As a result, at the GUI 310, the location information 313 may be determined without the use of the annotated phone book. For example, using the native caller ID feature of the mobile device, the location information 313 may be determined as "New York" based on the area code "347," which is known as statically associated with the New York city. As such, here in FIG. 3A, the GUI 310 may be configured to display the calling phone number 312 as "1-347-000-0000"; and the location information as "New York" (e.g., displaying the caller ID 311 as "Call from 1-347-000-0000 New York").

Here, at GUI 310, the user can also interact with the selectable options to perform actions with regard to the pending incoming call. In this example, the user can select the button 303 to screen the incoming call, select the button 305 to reply with a message, or select the button 308 to swipe up to answer the incoming call. The incoming call can be screened by various techniques to evaluate the characteristics of the calling entity. Exemplary screening techniques may include the user screening a message being recorded on an answering machine or voice mail, the user checking a caller ID display to see who or where the call is from, and the user checking the time or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using toKENs (SHAKEN) to identify calls associated with spoofing phone numbers, and the like.

FIG. 3B illustrates another exemplary GUI 320 of the application (e.g., the application 194) for displaying caller ID information to the user upon a call incoming at the mobile device. The GUI 320 may include a caller ID 321, as well as a set of buttons 303, 305, and 308 for the user to select. Here, similar to the caller ID 311 of the GUI 310, the caller ID 321 may be configured to display to the user that the call is from a calling entity associated with a calling phone number 322, as well as that the calling entity is at a location indicated by the location information 323. The difference here is that, in this example, the application has determined that the phone number has a corresponding entry in the annotated phone book (in some embodiments, and is not enlisted in the personal contacts of the user). As a result, the application may be configured to display the location information 323 at the GUI 320 based on the information included in the annotated phone book for the calling phone number.

As shown in FIG. 3B, in this example, at the GUI 320, for the call associated with the same phone number as described with reference to FIG. 3A, the location information 323 may be determined as "Maine" instead, based on the annotated phone number records associated with the phone number. For instance, the phone number record of customer may be annotated with an entry of "1-347-000-0000" paired with "Maine." As such, the GUI 320 may be configured to display the calling phone number 322 still as "1-347-000-0000"; but the location information as "Maine" (e.g., displaying the caller ID 321 as "Call from 1-347-000-0000 Maine").

Here, at GUI 320, the user can also interact with the selectable options to perform actions with regard to the pending incoming call. In this example, the user can also select the button 303 to screen the silenced call, select the button 305 to reply with a message, or select the button 308 to swipe up to answer the incoming call. The incoming call can be screened by various techniques to evaluate the characteristics of the calling entity as described above.

Although not illustrated in FIG. 3B, in some embodiments, the application may be further configured to display one or more GUI elements to represent a confidence score associated with the location information 323. As described above with reference to FIG. 2, as various factors may be used to establish a confidence score for the location information extracted from transaction data, such confidence score may be stored in association with the location information as part of the annotated phone book as well. Any suitable techniques may be implemented to represent and display the confidence score to the user. By way of non-limiting examples, the GUI 320 may be configured to display a confidence score as a percentage, in a gradient of colors (e.g., more blue hues indicating less confidence while more red hues indicating more confidence), with an emojis or animation, and so on.

In some embodiments, the confidence score retrieved from the annotated phone book may be further modified by the application based on contextual information such as, how contemporaneous the incoming call is relative to the timing information associated with the location information and/or the transaction data utilized to extract/derive the location information. For example, when the entry corresponding to the phone number is annotated with the location information that is extracted from a transaction made by the customer three days ago, absent other contextual information available on the customer, the application may be configured to further downgrade the confidence score for this location information with, for example, a pre-configured amount of percentage (e.g., for location information of an age of three days, downgrade the confidence score by 10%, for location information of an age of one day, downgrade the confidence score by 5%, and the like). In another example, when the entry corresponding to the phone number is annotated with the location information that is extracted from a transaction made by the customer one hour ago, absent other contextual information available on the customer, the application may be configured to display the confidence score as it is annotated in the respective phone number record.

Further, the user may also perform other actions upon the incoming call in addition to or in place of those illustrated in FIG. 3B. For example, the user can interact with the GUI 320 to decline the incoming call while it is pending, report the phone number included in the caller ID 321 to the server (e.g., the server 101 of FIG. 1) or log it locally as associated with a caller location other than the displayed location information 323 after screening the call, report or log locally the phone number as associated with a caller location other than the displayed location information 323 after selecting the button 308 to answer the call, report or log locally the phone number as associated correctly with the displayed location information 323 after selecting the button 308 to answer the call, and the like.

FIG. 3C illustrates yet another exemplary GUI 330 of the application (e.g., the application 194) for displaying caller location information as part caller ID to the user upon a call incoming at the mobile device. Similarly, the GUI 330 may include a caller ID 331, as well as a set of buttons 303, 305, and 308 for the user to select. Here, the caller ID 331 may be configured to display to the user that the call is from a calling entity associated with a calling phone number 332, as well as that the calling entity is at a location indicated by the location information 333. Here, the customer calls the user from the same phone number (e.g., 1-347-000-0000) while the customer is located in Maine. Compared to the GUI 320, in addition to determining that the phone number has a corresponding entry in the annotated phone book (in some embodiments, and the calling phone number is not enlisted in the personal contacts of the user), the application has determined to display the location information 333 of the customer at a location granularity different than the location information 323 of FIG. 3B.

In some embodiments, the location granularity may be determined by the application applying a display qualifier to modify the location information of the annotated phone number records for displaying to the user. For example, for the same phone number record of customer annotated with an entry of "1-347-000-0000" paired with "Maine," the application may be configured to apply the display qualifier based on profile information and contextual information of the user (and/or the customer) to determine a location granularity for displaying is at a region level, instead of the specific state. In this scenario, the display qualifier may be configured to require such less specific representation of the annotated location information for the phone number based on conditions such as: the location of the user (e.g., if the user is not determined as located in Maine), the relationship between the customer and the user (e.g., the user has only called the customer twice in the past year), and the like. More details of the display qualifier are described with reference to FIG. 4, below. Noted though, when the location granularity associated with the annotated location information may represent at a degree of the most specific location granularity, the display qualifier may specify to relax the granularity (e.g., a coarser location granularity) but not to increase the specificity (e.g., finer location granularity).

In some embodiments, the location granularity may be determined when the phone number record is annotated with the location information. In this scenario, the entry in the annotated phone book may be captured as, for example, an entry of "1-347-000-0000" paired with "New England Area." Here, the application may also be configured to apply a display qualifier, but the resulting location information is not affected by the application qualifier and remains the same as it is annotated in the annotated phone book.

As shown in FIG. 3C, in this example, at the GUI 330, for the call associated with the same phone number as described with reference to FIG. 3B, the location information 333 may be determined as "Maine" instead, based on the annotated phone number records associated with the phone number alone, or in conjunction with the above-described display qualifier. As such, here in FIG. 3C, the GUI 330 may be configured to display the calling phone number 332 still as "1-347-000-0000"; but the location information 333 as "New England Area" (e.g., displaying the caller ID 331 as "Call from 1-347-000-0000 New England Area").

Here, at GUI 330, the user can also interact with the selectable options to perform actions with regard to the pending incoming call. In this example, the user can also select the button 303 to screen the silenced call, select the button 305 to reply with a message, or select the button 308 to swipe up to answer the incoming call. The incoming call can be screened by various techniques to evaluate the characteristics of the calling entity as described above.

Although not illustrated in FIG. 3C, in some embodiments, the application may be further configured to display one or more GUI elements to represent a confidence score associated with the location information 333. The determination and displaying of such confidence score may be similar to those described with reference to FIG. 3B, the details of which are not repeated herein.

Further, the user may also perform other actions upon the incoming call in addition to or in place of those illustrated in FIG. 3C. For example, the user can interact with the GUI 330 to decline the incoming call while it is pending, report the phone number included in the caller ID 331 to the server (e.g., the server 101 of FIG. 1) or log it locally as associated with a caller location other than the displayed location information 333 after screening the call, report or log locally the phone number as associated with a caller location other than the displayed location information 333 after selecting the button 308 to answer the call, report or log locally the phone number as associated correctly with the displayed location information 333 after selecting the button 308 to answer the call, and the like.

In some embodiments, the displaying of the location information annotated in the phone book may be qualified with the above-described display qualifier. Referring back to FIG. 3A, the application may be configured to display the same location information 313 at the GUI 310, even when the calling phone number does have an entry in the annotated phone book or is not enlisted on the personal contacts of the user. In this scenario, by applying the display qualifier associated with the location information in the annotated phone book, the application may be configured to determine that the user is not allowed to access the location information. For example, the user may be too far away from the location associated with the customer (e.g., not meeting the requirement of the display qualifier to be within a pre-configured geo distance with the calling entity), or the user does not satisfy a relationship requirement of the display qualifier with respect to the customer, etc. Without the permission to display the location information, the application may, as described above, resort to other techniques to determine a location for the phone number (e.g., determine the location information as the location known as associated with the area code of the phone number). Details of the display qualifier are described with reference to FIG. 4, below.

Figure 4:
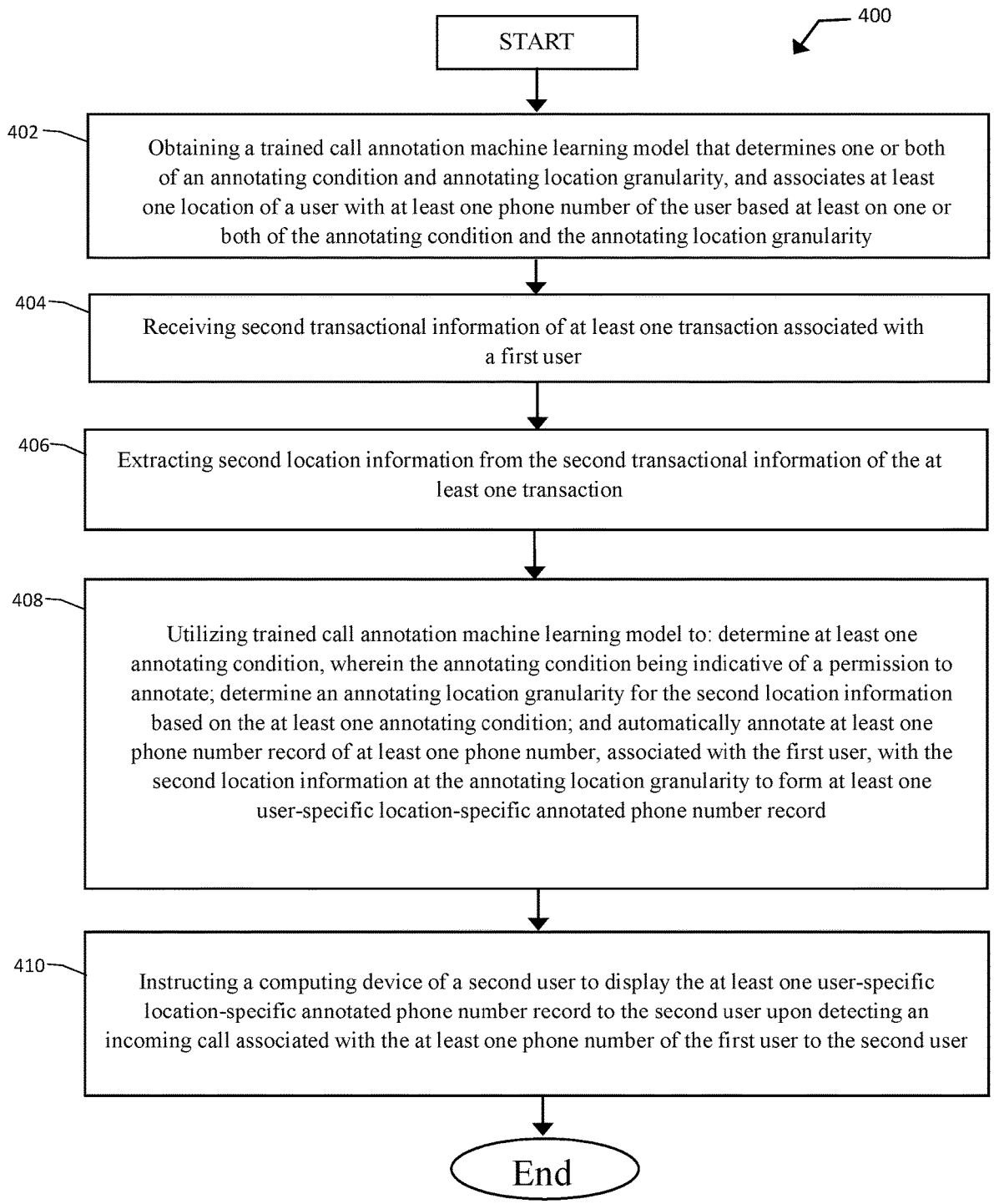
FIG. 4 is a flowchart illustrating an exemplary process related to location-aware caller identification, consistent with exemplary aspects of certain embodiments of the present disclosure.

FIG. 4 is a flow diagram illustrating an exemplary process 400 related to location-aware caller identification via one or more machine learning techniques, consistent with exemplary aspects of at least some embodiments of the present disclosure. Referring to FIG. 4, the illustrative location-aware caller identification process 400 may include: obtaining a trained call annotation machine learning model that would be trained to determine one or both of an annotating condition and annotating location granularity, and associates at least one location of a user with at least one phone number of the user based at least on one or both of the annotating condition and the annotating location granularity, at 402; receiving second transactional information of at least one transaction associated with a first user, at 404; extracting second location information from the second transactional information of the at least one transaction, at 406; utilizing the trained call annotation machine learning model to: 1) determine at least one annotating condition; 2) determine an annotating location granularity for the second location information based on the at least one annotating condition; and 3) automatically annotate at least one phone number record of at least one phone number, associated with the first user, with the second location information at the annotating location granularity to form at least one user-specific location-specific annotated phone number record, at 408; and instructing a computing device of a second user to display the at least one user-specific location-specific annotated phone number record to the second user upon detecting an incoming call associated with the at least one phone number of the first user to the second user, at 410. In other embodiments, the location-aware caller identification process 400 may be carried out, in whole or in part, in conjunction with at least one of a server, a transacting device, and/or a mobile device that would be connected via one or more networks to the server, which is executing instructions for performing one or more steps or aspects of various embodiments described herein.

In some embodiments, the location-aware caller identification process 400 may include, at 402, a step of obtaining a trained call annotation machine learning model that would be trained to determine one or both of: an annotating condition and/or annotating location granularity, and associate at least one location of a user with at least one phone number of the user based at least on one or both of the annotating condition and the annotating location granularity. With regard to the disclosed innovation, the call annotation machine learning model may be trained based at least in part on training data including one or more of: i) first location information of a first plurality of users, the first location information associated with first transaction information of the first plurality of users; ii) phone number information of a first plurality of phone numbers associated with the first plurality of users, the first plurality of phone numbers associated with the first location information; and/or (iii) at least one of: profile information of the first plurality of users; and/or contextual information associated with the first plurality of users.

In some implementations, the call annotation machine learning model may be further trained to determine at least one display qualifier and associate the at least one display qualifier with an annotated record including the one location of the user and the at least one phone number of the user, as described above. Correspondingly, the above-described training data may further include one or more of: phone number information of a second plurality of phone numbers of a second plurality of users, the second plurality of phone numbers associated with calls placed by the first plurality of users from the first plurality of phone numbers, profile information of the second plurality of users, and/or contextual information of the second plurality of users.

In some embodiments, the first location information may include location information similar to the location information illustrated with reference to FIG. 2, the details of which therefore are not repeated. The profile information of a user of the first plurality of users may include information relating to one or more of: demographic information, account information, application usage information, any data provided by the user, any data provided on behalf of the user, and the like. The contextual information of the user may include information relating to one or more of: a timing, a location of the user, an action of a user, calendar information of the user, contact information of the user, habits of the user, preferences of the user, purchase history of the user, browsing history of the user, communication history, travel history, online payment service history, profile and/or contextual information of individual(s) and entity(ies) the user is associated with, and the like. In some embodiments, the user's profile information and/or contextual information may be provided by the user, detected by a server (e.g., the server 101 of FIG. 1), and/or a component external thereto, or in a combination thereof.

In some embodiments, the call annotation machine learning model may be trained via a server (e.g., the server 101 of FIG. 1), such as a processor of a computer platform, or an online computer platform. In some embodiments, the processor may be associated with an entity that may provide a financial service to the user. Here, for example, the at least one computer platform may include a financial service provider (FSP) system. This FSP system may include one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. As such, the financial service entity may have access to various transaction data of its customers, as well as various personal information of the customers (e.g., phone numbers, profile information, contextual information, etc.). In other embodiments, the FSP system may outsource the training to a third-party model generator, or otherwise leverage the training data (e.g., first location information of the first plurality of users, phone number information of the first plurality of phone numbers associated with the first plurality of users, profile information/contextual information of the first plurality of users, etc.), and/or trained models from a third-party data source, third-party machine learning model generators, and the like.

In some embodiments, the call annotation machine learning model may be trained via a server (e.g., the server 101) in conjunction with a computing device associated with a user (e.g., the first user of FIG. 1). Here, for example, the server may be configured to initially train a baseline call annotation model based on the above-described training data pertaining to the first plurality of users (and/or the second plurality of users) and/or a plurality of such training data from the plurality of third-party data sources. Subsequently, the baseline call annotation model may be transmitted to the computing device of the first user to be trained with the particular training data pertaining to annotating the first user's phone number information with location information. In other words, a call annotation model may be trained in various manners as a user-specific (e.g., calling user specific) model in implementations.

According to some aspects of the disclosure, equipped with the vast amount of data corresponding to whether, when, and/or how the users' phone number records are annotated with the respective location information, the exemplary trained call annotation machine learning model may classify the first plurality of users into categories of annotation conditions based their profile information, contextual information, and the location information extracted for annotation. Each category may include a set of features including at least one of, e.g., a temporal condition, a spatial condition, a relationship condition, a pattern condition, and so on. For example, the call annotation machine learning model may be trained to learn that, when a user stops on his/her morning commute to work for coffee/gas during the week, or drives to have lunch during lunch time during the week, the location information extracted from the transaction of purchasing coffee, gas, and lunch may not be used to update the location information that is already captured in the phone number record of the user (e.g., the temporal condition indicating that it is morning commute time or lunch time during work days is sufficient to disallow any update to the location information of the user, regardless of whether there is any transactions). In another example, the trained call annotation machine learning model may be trained to learn that, when the user purchases meals, coffee, or gas during the weekend or holiday away from his/her residential home, the location information extracted based on these transactions may be used to annotate the phone number record of the user (e.g., the temporal condition indicating that it is time outside of work days, together with new location detected based on transactions is sufficient to allow update(s) to the location information of the user). In yet another example, the trained call annotation machine learning model may be trained to learn that, when the user purchases a movie ticket at a theater, the location extracted from the transaction may be used to annotate the phone number record for a limited period of time (e.g., having a timestamp and a period of time of validity, etc.) as the user may go back to home afterwards, and such location information may only be provided to those people with whom the user is about to see the movie with (e.g., the temporal condition indicating that the user is at the new location for a limited amount of time together with the relationship condition indicating that who are seeing the movie with the user (e.g., by referencing other communications/calendar entries of the user, etc.) is sufficient to allow update(s) to the location information of the user and associate a display qualifier to allow it to be displayed only those qualified people). In yet another example, the trained call annotation machine learning model may be trained to learn that, when the user makes transactions on a business trip to a destination city, the location information extracted from these transactions may be used to update the location information of the phone number record and displayed only to those who are his/her colleagues, family members, friends, who travels together with the user to the destination city, and the like.

In various embodiments, the location information extracted from the transaction data of the user may be in various forms such as a street address, a landmark name, a district name, and the like. For example, for transactions made in a brick and mortar store, the location information may be obtained as a street address associated with the physical store. However, even if the annotation condition is determined as allowing the location information to be used to update the phone number record, the user may apply additional privacy controls such that, either the extracted location information is represented at a different location granularity (e.g., a coarser granularity with less specific geographical information), or a display qualifier is required to modify the location granularity based on the profile/contextual information of the call receiving users. In those cases, location information of a street address may be represented as, for example, a district or neighborhood, a city, a state, a region, which the street address belongs to, and so on.

In some embodiments, the call annotation machine learning model may learn from the users' behaviors with regard to annotating the phone number record with location information. For example, the first user of FIG. 1 may be provided with an application (e.g., application 194) executing on the first computing device 150 to manually configure and/or update an annotation condition and/or annotating location granularity when the server 101 obtains new location information from transaction data of the first user.

The location-aware caller identification process 400 may include, at 404, a step of receiving second transactional information of at least one transaction associated with a first user; and at 406, a step of extracting second location information from the second transactional information of the at least one transaction. According to various embodiments, the at least one transaction may include a transaction of any types of transaction such as, credit card transaction, mobile pay transaction, loyalty points based transaction, virtual goods based transaction, over-the-counter bank transaction, ATM transaction, and the like. Such transaction may be performed by the first user either in person (e.g., at a point of sale (POS) device of a merchant at a physical store), or remotely (e.g., via the phone, at the Internet, etc.). Various transaction data may be obtained from the transaction to include information such as the information of the first user (e.g., the identification information, profile information, contextual information, the delivery address, etc.), the information of the party transacting with the first user (e.g., the identification information, physical address, pick-up address, etc.), the information pertaining to the goods and/or services associated with the transaction, the time information of the transaction, and so on. Examples illustrating how the location information may be extracted from the transaction data are similar to those described above with reference to FIG. 2, and are not repeated herein. Further, any suitable techniques may be applied to extract location information from the transaction data, not limited by those illustrated examples.

The location-aware caller identification process 400 may include, at 408, a step of utilizing the trained call annotation machine learning model to determine at least one annotating condition, determine an annotating location granularity for the second location information based on the at least one annotating condition, and automatically annotate at least one phone number record of at least one phone number, associated with the first user, with the second location information at the annotating location granularity to form at least one user-specific location-specific annotated phone number record.

In some embodiments, the location-aware caller identification process 400 may be configured to determine a display qualifier associated with the second user, the display qualifier indicative of at least one condition under which the second location information is to be displayed at the computing device associated with the second user upon detecting the incoming call from the first user to the second user. The display qualifier may be configured to specify various conditions or criteria based on which the second location information is qualified to be displayed to the second user. Such conditions or criteria may include any suitable static conditions, and/or dynamic conditions based on various respective profile and/or contextual information associated with the second user, the first user, the computing device of the second user, and/or the computing device of the first user.

In some implementations, the location-aware caller identification process 400 may determine the display qualifier based on one or more factors pre-configured by the first user. For instance, the first user may pre-configure such display qualifier to allow the second location information associated with the at least one user-specific location-specific annotated phone number record to be displayed to the second user when the second user is located in the same city as indicated by the second location information of the first user, on the list of the first user's personal contacts, a particular application is executing on the computing device of the first user, and the like.

In some embodiments, the display qualifier may include one or more conditions of respective, pre-configured relationships between the first user and the second user. By way of non-limiting examples, a pre-configured relationship may require that the second user has initiated communicated with the first user in a pre-configured period of time in the past (e.g., the last three days, the last week, the last two weeks, etc.), the first user has initiated communicated with the second user in a pre-configured period of time in the past (e.g., the last three days, the last week, the last two weeks, etc.), the first user has enlisted the phone number of the second user in his or her personal contacts, the second user has enlisted the phone number of the first user in his or her personal contacts, and so on.

In one example, such a pre-configured relationship may include a pre-configured threshold of a geo-distance between a location of the first user and a location of the second user, at the time when the call is placed by the first user to the second user. In some embodiments, when the location information associated with the phone number of the second user also has an entry in the annotated phone book as the first user, the geo-distance may be computed based on the first user and second user's location information. In other embodiments, the geo-distance may be computed using any suitable techniques, not limited by the examples herein.

In some embodiments, the display qualifier may be satisfied based on at least one of: profile information of the first and/or second user, context of the first and/or second user, and/or location information associated with the at least one phone number of the second user. For example, the profile information of the first user may include information indicating that the second user is a high school classmate, a college classmate, a colleague at work, a family member, and the like. In another example, the profile information of the second user may include information in his/her personal contacts describing the first user as a family member, a colleague at work, and the like. In another example, the first user's calendar entry may indicate that the second user is on the same business trip, and vice versa.

In some embodiments, the display qualifier may be configured to dictate not only whether the second location information is to be displayed to the second user, but also how the second location information is to be displayed to the second user. In one example, as illustrated with reference to FIG. 3C above, the display qualifier may be configured to modify the second location information of the first user into indicating a location of a less specific location granularity. For example, even though the at least one user-specific location-specific annotated phone number record captures the second location as "Maine," the display qualifier may only allow the second location information modified into "New England Area" to be displayed to the second user, depending on various respective profile and/or contextual information of the second user.

In some embodiments, the display qualifier may be conditioned on at least an application executing on the computing device associated with the first user and/or the computing device associated with the second user. For example, the display qualifier may require that the first user is associated with an application (e.g., DoorDash, Uber ride, etc.) executing on the computing device thereof. This way, when the first user calls the second user to fulfill a service for the second user (e.g., delivery from DoorDash, pick up for an Uber ride, etc.), the display qualifier may allow the second location information to be displayed to the second user. In this scenario, in some embodiments, if the first user is not calling the second user in association with an operation related the application, the second location information may not be allowed to be displayed to the second user. Similarly, such first-user-context-based display qualifier may be configured to require the second location be modified in a pre-configured or dynamically determined manner as well, before being presented to the second user. For instance, when stored in the annotated record at a location granularity of a street address, the second location information may be modified to be displayed to the second user at a location granularity of a district level, a neighborhood level, and the like.

On the other hand, the display qualifier may be conditioned on an application executing on the computing device of the second user too. In this scenario, the display qualifier may be applied similar to the other examples illustrated herein, e.g., based on the profile information and/or contextual information of the second user. In this case, the contextual information of the second user is that the application is executing on the computing device of the second user. Again, using the example of the first user calls the second user for the purpose of fulfilling a delivery, the display qualifier may allow the second location information to be displayed to the second user as long as the application (e.g., DoorDash, Uber ride, etc.) is executing on the second user's computing device. In some embodiments, the display qualifier may be conditioned on the application executing on both of the computing device of the first user and the computing device of the second user. In other embodiments, the condition of the application executing on at least one of the computing devices of the first and second user may be further specified with additional criteria such as when, and/or how the first user and/or the second user has interacted with the application, and so on.

The location-aware caller identification process 400 may include, at 412, a step of instructing a computing device of a second user to display the at least one user-specific location-specific annotated phone number record to the second user upon detecting an incoming call associated with the at least one phone number of the first user to the second user.

In some embodiments, the at least one user-specific location-specific annotated phone number record may be configured as a phone book pushed from a server (e.g., the server 101) to the computing device of the second user (e.g., the second computing device 180), as described above with reference to FIG. 2. Any suitable data structure as well as any suitable data transmission techniques may be utilized to store the annotated record and/or communicate the annotated phone number record to the computing device of the second user. In some implementations, the annotated record may be communicated to the computing device of the second user when the incoming call is detected as being placed from the at least one phone number of the first user to the second user (e.g., the computing device of the second user may retrieve the annotated record from the server). In other implementations, the annotated record may be pushed by the server, and/or retrieved by the computing device of the second user at, for example, a pre-configured schedule, independent of whether a call is placed from the first user to the second user. In various embodiments, either the entire content or portions of the annotated record may be communicated to the computing device of the second user.

In some embodiments, as illustrated with reference to FIGS. 3B-3C, the second location information may be configured to be displayed to the second user as part of the caller ID on the computing device upon detecting the incoming call. In some implementations, the caller ID screen of the computing device of the second user may be enhanced via, for example, an application (e.g., the application 194) executing on the computing device of the second user to detect communication incoming at the computing device of the second user. In some embodiments, the application may also be configured to allow the user to communicate a permission indicator identifying permission by the second user to detect communications such as calls being received by a computing device of the second user. The details are similar to those described with reference to FIG. 1, and not repeated herein. In other embodiments, the permission indicator may be received from an application such as a web page allowing the user to configure his or her settings at a web browser. The user may configure the settings related to calls, and/or other communication detection capabilities for various computing devices thereof. That is, the permission indicator may be received from an application and/or a computing device other than the application for detecting the calls (and other communications), or the computing device on which the call detecting/protection application is executing.

In some embodiments, the location-aware caller identification process 400 may also include a step of receiving configuration information from a computing device associated with the first user to configure one or more of: the at least one annotating condition, the display qualifier, and/or the location granularity. That is, in addition to and/or separately from the use of the above-described call annotation machine learning model to learn the first user's preference with regard to those annotating features, the first user may be enabled to manually configure one or more of those features. For example, the first user may be allowed to configure the annotating condition as always permitting the annotation if located within his/her resident state, and not permitting the annotation if traveling outside of the resident state. In another example, the first user may configure the location granularity as permitting annotation at a district level when located in the resident state, but permitting annotation at a state level when traveling outside of the state. In another example, the first user may configure a display qualifier as permitting the location information to the second user when the second user is located in the same state or the same city as the first user. In some implementations, various techniques may be applied to enable the first user to configure those features and/or conditions. By way of non-limiting examples, the first user may use an application such as the application 194 executing on the computing device of the first user, a web browser application (either executing on the computing device of the first user or another separate computing device) accessing a web portal, and the like.

In some embodiments, the operation(s) of the first user with regard to configuring these features and/or conditions may be used as training data to train or re-train the call annotation machine learning model, together with the profile information and/or contextual information associated with the first user's operation(s). For instance, when traveling to a foregoing country on a personal vacation, the first user may manually configure the annotation condition, from a previous state of allowing annotation all the time, to a new state of disallowing annotation until coming back to the states. In another example, when the first user travels to a foreign country on a business trip, the first user may manually configure the annotation condition to only allow annotating with the identity of the foreign country, not with specific whereabouts, and/or configure the display qualifier to allow such annotated location information to be displayed only to the first user's colleagues and family members. As such, the call annotation machine learning model may be trained with such operations in the particular context such that, the next time the first user travels abroad on a vacation, the call annotation machine learning model may automatically stop annotating the first user's phone number record while the first user is on vacation. Similarly, the next time the first user goes on a business trip, the call annotation machine learning model may automatically annotate the first user's phone number with the destination's country information, and not more, even the transaction data of the first user may indicate more detailed location information such as a city, a street address associated with the phone number.

Figure 5:
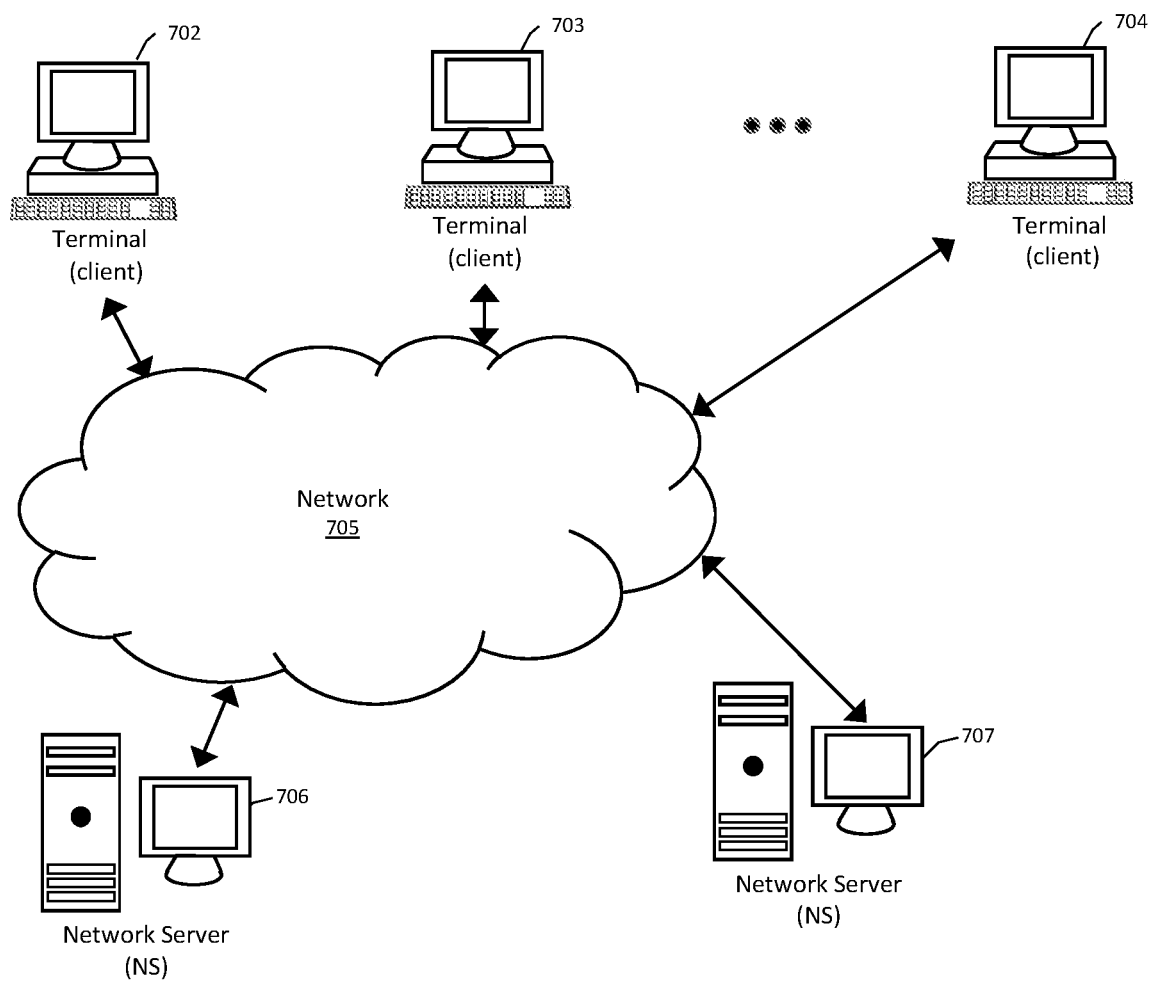
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the server 101 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (TRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
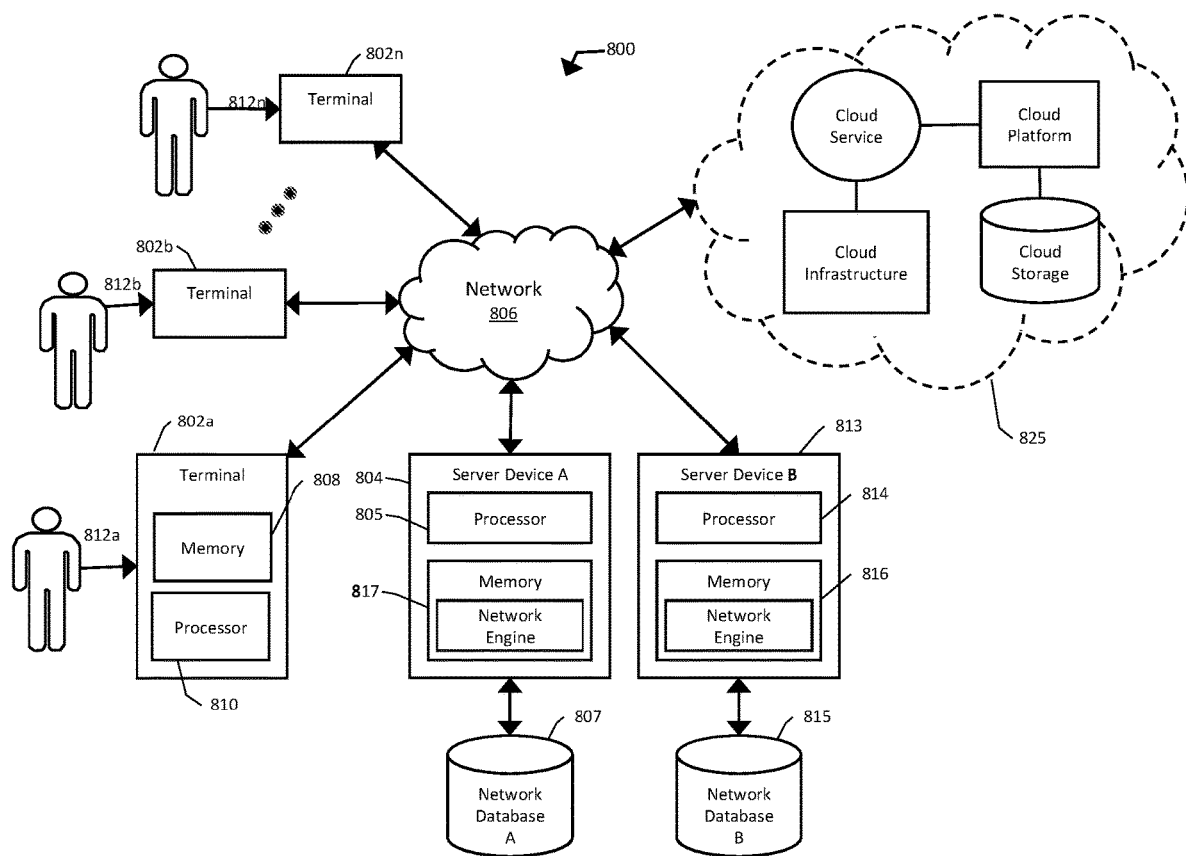
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 802a through 802n may also include a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805/814 and/or respective memory 817/816. In some embodiments, the processor 805/814 may execute computer-executable program instructions stored in memory 817/816, respectively. In some embodiments, the processor 805/814 may include a microprocessor, an ASIC, and/or a state machine. In some embodiments, the processor 805/814 may include, or may be in communication with, media, for example computer-readable media, which stores instructions that, when executed by the processor 805/814, may cause the processor 805/814 to perform one or more steps described herein. In some embodiments, examples of computer-readable media may include, but are not limited to, an electronic, optical, magnetic, or other storage or transmission device capable of providing a processor, such as the respective processor 805/814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls enterprise, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable enterprise that may result in one or more applicable data structures that may include fields, records, files, and/or objects. In some embodiments, the exemplary DBMS-managed database may be specifically programmed to include metadata about the data that is stored.

Figure 7:
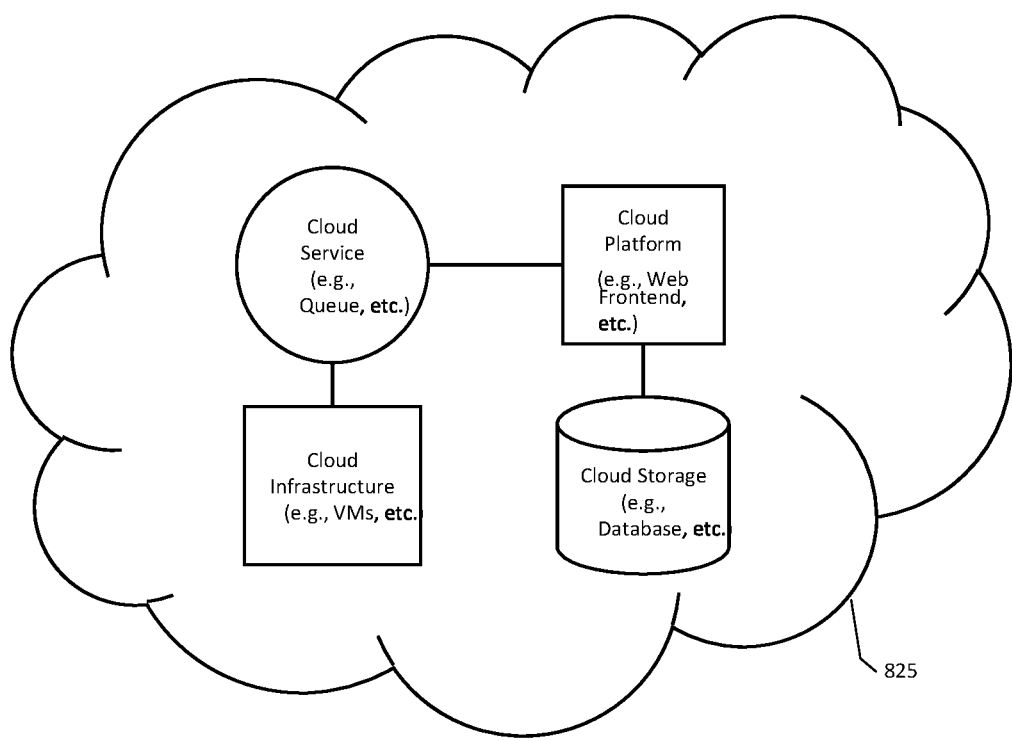
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
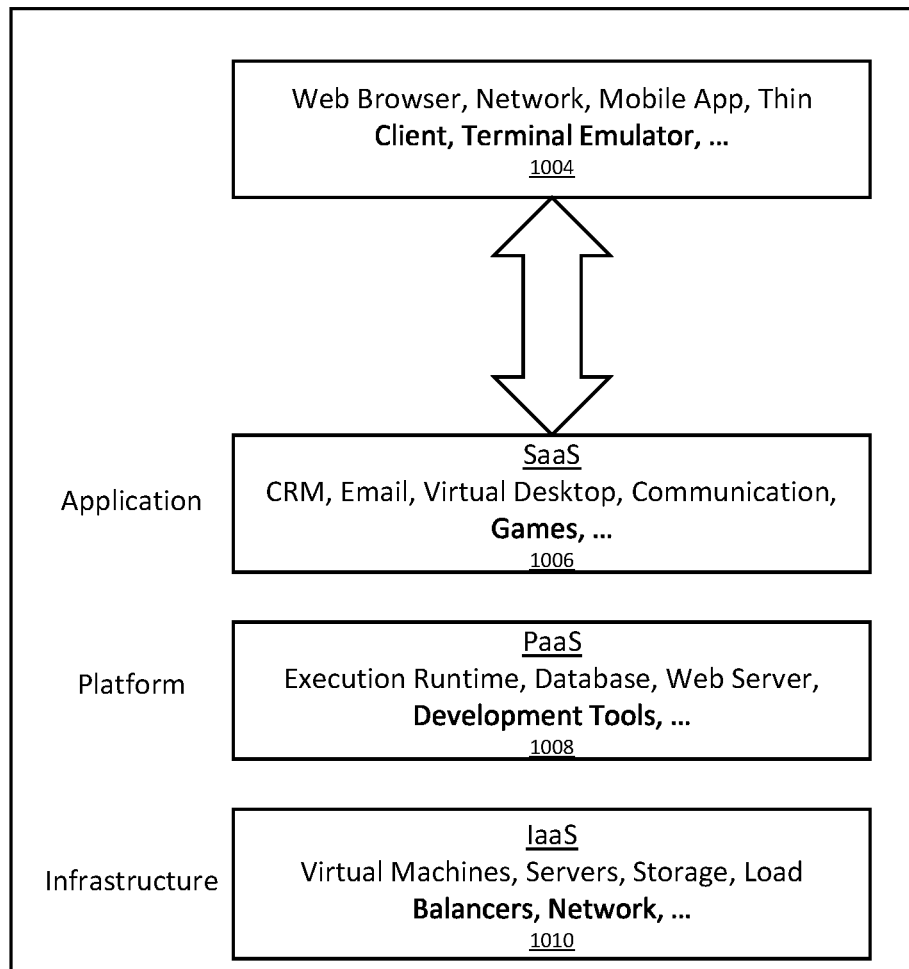

As also shown in FIGS. 7 and 8, some embodiments of the disclosed technology may also include and/or involve one or more cloud components of Internet cloud 825, which are shown grouped together in the drawing for sake of illustration, though may be distributed in various ways as known in the art. Cloud components of Internet cloud 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Various embodiments described herein may be performed in real-time and/or dynamically/automatically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "location data," and "location information" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including at least steps of:
  obtaining, by one or more processors, a trained call annotation machine learning model that determines one or both of an annotating condition and annotating location granularity, and associates at least one location of a user with at least one phone number of the user based at least on one or both of the annotating condition and the annotating location granularity;
  receiving, by the one or more processors, second transactional information of at least one transaction associated with a first user;
  extracting, by the one or more processors, second location information from the second transactional information of the at least one transaction;
  utilizing, by the one or more processors, the trained call annotation machine learning model to:
    determine at least one annotating condition based on at least one of: the second transaction information, profile information, or contextual information of the first user, wherein the annotating condition being indicative of a permission to annotate;
    determine an annotating location granularity for the second location information based on the at least one annotating condition; and
    automatically annotate at least one phone number record of at least one phone number, associated with the first user, with the second location information at the annotating location granularity to form at least one user-specific location-specific annotated phone number record; and
  instructing, by the one or more processors, a computing device of a second user to display the at least one user-specific location-specific annotated phone number record to the second user upon detecting an incoming call associated with the at least one phone number of the first user to the second user.

Clause 2. The method of clause 1 or any clause herein, where to annotate at least one phone number record of at least one phone number includes:
  determining, by the one or more processors, a display qualifier associated with the second user, the display qualifier indicative of at least one condition under which the second location information is to be displayed at the computing device associated with the second user upon detecting the incoming call from the first user to the second user.

Clause 3. The method of clause 2 or any clause herein, further including:
  determining, by the one or more processors, the display qualifier is satisfied based on at least one of: profile information of the first and/or second user, context of the first and/or second user, or location information associated with the at least one phone number of the second user Clause 4. The method of clause 2 or any clause herein, where the display qualifier includes a condition of a pre-configured relationship between the first user and the second user.

Clause 5. The method of clause 4 or any clause herein, where the pre-configured relationship includes a pre-configured threshold of a geo-distance between a location of the first user and a location of the second user.

Clause 6. The method of clause 2 or any clause herein, where the display qualifier is conditioned on at least an application executing on the computing device associated with the first user and/or the computing device associated with the second user.

Clause 7. The method of clause 2 or any clause herein, further including:
  receiving, by the one or more processors, configuration information from a computing device associated with the first user to configure one or more of: the at least one annotating condition, the display qualifier, and the location granularity.

Clause 8. The method of clause 1 or any clause herein, where the trained call annotation machine learning model is user-specific.

Clause 9. A system including:
  one or more processors; and
  a memory in communication with the one or more processors and storing instructions that, when executed by the one or more processors, cause the one or more processors to:
    obtain a trained call annotation machine learning model that determines one or both of an annotating condition and annotating location granularity, and associates at least one location of a user with at least one phone number of the user based at least on one or both of the annotating condition and the annotating location granularity;
    receive second transactional information of at least one transaction associated with a first user;
    extract second location information from the second transactional information of the at least one transaction;
    utilize the trained call annotation machine learning model to:
      determine at least one annotating condition based on at least one of: the second transaction information, profile information, or contextual information of the first user, where the annotating condition being indicative of a permission to annotate;
      determine an annotating location granularity for the second location information based on the at least one annotating condition; and
      automatically annotate at least one phone number record of at least one phone number, associated with the first user, with the second location information at the annotating location granularity to form at least one user-specific location-specific annotated phone number record;
    transmitting the at least one user-specific location-specific annotated phone number record to a computing device of a second user; and
    instruct the computing device of the second user to display the at least one user-specific location-specific annotated phone number record to the second user upon detecting an incoming call associated with the at least one phone number of the first user to the second user.

Clause 10. The system of clause 9 or any clause herein, where to annotate at least one phone number record of at least one phone number includes:
  determining, by the one or more processors, a display qualifier associated with the second user, the display qualifier indicative of at least one condition under which the second location information is to be displayed at a computing device associated with the second user upon an incoming call from the first user to the second user.

Clause 11. The system of clause 10 or any clause herein, where the instructions further cause the one or more processors to:
  detect a call from the first user to the second user, the call associated with the at least one phone number of the first user and at least one phone number of the second user; and
  determine the display qualifier is satisfied based on at least one of: profile information of the first and/or second user, context of the first and/or second user, or location information associated with the at least one phone number of the second user.

Clause 12. The system of clause 10 or any clause herein, where the display qualifier includes a condition of a pre-configured relationship between the first user and the second user.

Clause 13. The system of clause 12 or any clause herein, where the pre-configured relationship includes a pre-configured threshold of a geo-distance between a location of the first user and a location of the second user.

Clause 14. The system of clause 10 or any clause herein, where the display qualifier is conditioned on at least an application executing on the computing device associated with the first user and/or the computing device associated with the second user.

Clause 15. The system of clause 10 or any clause herein, where the instructions further cause the one or more processors to:
  receive configuration information from a computing device associated with the first user to configure one or more of: the at least one annotating condition, the display qualifier, and the location granularity.

Clause 16. The system of clause 9 or any clause herein, where the trained call annotation machine learning model is user-specific.

Clause 17. A non-transitory computer readable storage medium for tangibly storing computer program instructions capable of being executed by a computer processor, the computer program instructions defining the steps of:
  obtaining a trained call annotation machine learning model that determines one or both of an annotating condition and annotating location granularity, and associates at least one location of a user with at least one phone number of the user based at least on one or both of the annotating condition and the annotating location granularity;
  receiving second transactional information of at least one transaction associated with a first user;
  extracting second location information from the second transactional information of the at least one transaction;
  utilizing the trained call annotation machine learning model to:
    determine at least one annotating condition based on at least one of: the second transaction information, profile information, or contextual information of the first user, where the annotating condition being indicative of a permission to annotate;
    determine an annotating location granularity for the second location information based on the at least one annotating condition; and
    automatically annotate at least one phone number record of at least one phone number, associated with the first user, with the second location information at the annotating location granularity to form at least one user-specific location-specific annotated phone number record; and
transmitting the at least one user-specific location-specific annotated phone number record to a computing device of a second user.

Clause 18. The computer readable storage medium of clause 18 or any clause herein, where to annotate at least one phone number record of at least one phone number includes:
  determining a display qualifier associated with the second user, the display qualifier indicative of at least one condition under which the second location information is to be displayed at a computing device associated with the second user upon an incoming call from the first user to the second user.

Clause 19. The computer readable storage medium of clause 18 or any clause herein, where the steps further including:
  detecting a call from the first user to the second user, the call associated with the at least one phone number of the first user and at least one phone number of the second user; and
  determining the display qualifier is satisfied based on at least one of: profile information of the first and/or second user, context of the first and/or second user, or location information associated with the at least one phone number of the second user; and
  instructing the computing device of the second user to display the at least one user-specific location-specific annotated phone number record to the second user Clause 20. The computer readable storage medium of clause 18 or any clause herein, where the display qualifier includes a condition of a pre-configured relationship between the first user and the second user.

While one or more embodiments of the present disclosure have been described, these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
  obtaining, by one or more processors, a trained call annotation machine learning model that determines one or both of an annotating condition and annotating location granularity, and associates at least one location of a user with at least one phone number of the user based at least on one or both of the annotating condition and the annotating location granularity;
  receiving, by the one or more processors, second transactional information of at least one transaction associated with a first user;
  extracting, by the one or more processors, second location information from the second transactional information of the at least one transaction;
  utilizing, by the one or more processors, the trained call annotation machine learning model to:
    determine at least one annotating condition based on at least one of: the second transaction information, profile information, or contextual information of the first user, wherein the annotating condition being indicative of a permission to annotate;
    determine an annotating location granularity for the second location information based on the at least one annotating condition; and
    automatically annotate at least one phone number record of at least one phone number, associated with the first user, with the second location information at the annotating location granularity to form at least one user-specific location-specific annotated phone number record; and
  instructing, by the one or more processors, a computing device of a second user to display the at least one user-specific location-specific annotated phone number record to the second user upon detecting an incoming call associated with the at least one phone number of the first user to the second user.

2. The method of claim 1, wherein to annotate at least one phone number record of at least one phone number comprises:
  determining, by the one or more processors, a display qualifier associated with the second user, the display qualifier indicative of at least one condition under which the second location information is to be displayed at the computing device associated with the second user upon detecting the incoming call from the first user to the second user.

3. The method of claim 2, further comprising:
  determining, by the one or more processors, the display qualifier is satisfied based on at least one of: profile information of the first and/or second user, context of the first and/or second user, or location information associated with the at least one phone number of the second user.

4. The method of claim 2, wherein the display qualifier includes a condition of a pre-configured relationship between the first user and the second user.

5. The method of claim 4, wherein the pre-configured relationship comprises a pre-configured threshold of a geo-distance between a location of the first user and a location of the second user.

6. The method of claim 2, wherein the display qualifier is conditioned on at least an application executing on the computing device associated with the first user and/or the computing device associated with the second user.

7. The method of claim 2, further comprising:
receiving, by the one or more processors, configuration information from a computing device associated with the first user to configure one or more of: the at least one annotating condition, the display qualifier, and the location granularity.

8. The method of claim 1, wherein the trained call annotation machine learning model is user-specific.

9. A system comprising:
one or more processors; and
a memory in communication with the one or more processors and storing instructions that, when executed by the one or more processors, cause the one or more processors to:
obtain a trained call annotation machine learning model that determines one or both of an annotating condition and annotating location granularity, and associates at least one location of a user with at least one phone number of the user based at least on one or both of the annotating condition and the annotating location granularity;
receive second transactional information of at least one transaction associated with a first user;
extract second location information from the second transactional information of the at least one transaction;
utilize the trained call annotation machine learning model to:
determine at least one annotating condition based on at least one of: the second transaction information, profile information, or contextual information of the first user, wherein the annotating condition being indicative of a permission to annotate;
determine an annotating location granularity for the second location information based on the at least one annotating condition; and
automatically annotate at least one phone number record of at least one phone number, associated with the first user, with the second location information at the annotating location granularity to form at least one user-specific location-specific annotated phone number record;
transmitting the at least one user-specific location-specific annotated phone number record to a computing device of a second user; and
instruct the computing device of the second user to display the at least one user-specific location-specific annotated phone number record to the second user upon detecting an incoming call associated with the at least one phone number of the first user to the second user.

10. The system of claim 9, to annotate at least one phone number record of at least one phone number comprises:
determining, by the one or more processors, a display qualifier associated with the second user, the display qualifier indicative of at least one condition under which the second location information is to be displayed at a computing device associated with the second user upon an incoming call from the first user to the second user.

11. The system of claim 10, wherein the instructions further cause the one or more processors to:

detect a call from the first user to the second user, the call associated with the at least one phone number of the first user and at least one phone number of the second user; and
determine the display qualifier is satisfied based on at least one of: profile information of the first and/or second user, context of the first and/or second user, or location information associated with the at least one phone number of the second user.

12. The system of claim 10, wherein the display qualifier includes a condition of a pre-configured relationship between the first user and the second user.

13. The system of claim 12, wherein the pre-configured relationship comprises a pre-configured threshold of a geo-distance between a location of the first user and a location of the second user.

14. The system of claim 10, wherein the display qualifier is conditioned on at least an application executing on the computing device associated with the first user and/or the computing device associated with the second user.

15. The system of claim 10, wherein the instructions further cause the one or more processors to:
receive configuration information from a computing device associated with the first user to configure one or more of: the at least one annotating condition, the display qualifier, and the location granularity.

16. The system of claim 9, wherein the trained call annotation machine learning model is user-specific.

17. A non-transitory computer readable storage medium for tangibly storing computer program instructions capable of being executed by a computer processor, the computer program instructions defining the steps of:
obtaining a trained call annotation machine learning model that determines one or both of an annotating condition and annotating location granularity, and associates at least one location of a user with at least one phone number of the user based at least on one or both of the annotating condition and the annotating location granularity;
receiving second transactional information of at least one transaction associated with a first user;
extracting second location information from the second transactional information of the at least one transaction;
utilizing the trained call annotation machine learning model to:
determine at least one annotating condition based on at least one of: the second transaction information, profile information, or contextual information of the first user, wherein the annotating condition being indicative of a permission to annotate;
determine an annotating location granularity for the second location information based on the at least one annotating condition; and
automatically annotate at least one phone number record of at least one phone number, associated with the first user, with the second location information at the annotating location granularity to form at least one user-specific location-specific annotated phone number record; and
transmitting the at least one user-specific location-specific annotated phone number record to a computing device of a second user.

18. The computer readable storage medium of claim 17, to annotate at least one phone number record of at least one phone number comprises:
determining a display qualifier associated with the second user, the display qualifier indicative of at least one condition under which the second location information is to be displayed at a computing device associated with the second user upon an incoming call from the first user to the second user.

19. The computer readable storage medium of claim 18, the steps further comprising:
- detecting a call from the first user to the second user, the call associated with the at least one phone number of the first user and at least one phone number of the second user;
- determining the display qualifier is satisfied based on at least one of: profile information of the first and/or second user, context of the first and/or second user, or location information associated with the at least one phone number of the second user; and
- instructing the computing device of the second user to display the at least one user-specific location-specific annotated phone number record to the second user.

20. The computer readable storage medium of claim 18, wherein the display qualifier includes a condition of a pre-configured relationship between the first user and the second user.

* * * * *